United States Patent [19]

Denz et al.

[11] 4,389,994

[45] Jun. 28, 1983

[54] INTERNAL COMBUSTION ENGINE CONTROL SYSTEM FOR USE WITH TURBO-CHARGED ENGINE, AND METHOD

[75] Inventors: Helmut Denz, Stuttgart; Hans-Peter Stumm, Hemmingen; Martin Zechnall, Schwieberdingen, all of Fed. Rep. of Germany

[73] Assignee: Robert Bosch GmbH, Stuttgart, Fed. Rep. of Germany

[21] Appl. No.: 270,964

[22] Filed: Jun. 5, 1981

[30] Foreign Application Priority Data

Jun. 14, 1980 [DE] Fed. Rep. of Germany ....... 3022427

[51] Int. Cl.$^3$ .................. G05B 15/02; F02D 5/00; F02B 3/10; F02D 21/04
[52] U.S. Cl. .................. 123/478; 123/480; 123/417; 60/605
[58] Field of Search ............... 123/478, 480, 486, 417, 123/421; 60/601, 603, 605

[56] References Cited

U.S. PATENT DOCUMENTS

| | | | |
|---|---|---|---|
| 3,049,805 | 8/1962 | Drayer | 60/601 |
| 4,147,467 | 4/1979 | Leicht et al. | 60/605 |
| 4,242,728 | 12/1980 | Hartford | 123/480 |
| 4,244,023 | 1/1981 | Johnson | 123/417 |
| 4,249,382 | 2/1981 | Evans et al. | 60/605 |
| 4,250,858 | 2/1981 | Jeenicke et al. | 123/417 |
| 4,267,569 | 5/1981 | Baumann et al. | 123/417 |
| 4,309,759 | 1/1982 | Tokuda et al. | 123/480 |
| 4,310,888 | 1/1982 | Furuhashi et al. | 123/417 |

*Primary Examiner*—Raymond A. Nelli
*Attorney, Agent, or Firm*—Frishauf, Holtz, Goodman & Woodward

[57] ABSTRACT

To permit operation of engines, particularly turbo-charged engines, at the maximum power level just short of causing engine knocking, and preventing engine knocking, temperatures in the engine are sensed and, if an excessive temperature signal is detected, for example excessive engine temperature, exhaust gas temperature, turbo-charged air, or turbo charger temperature, a fuel supply system, for example a fuel injection system, is controlled to enrich the mixture, for example by multiplying the fuel injection time by a factor as commanded by an additional control stage (26, 27, 30) which stores in a memory, such as a ROM (27), engine operating characteristic curves. In addition, spark retardation by a retarding angle ($\alpha 1$) can be commanded, the spark retardation in combination with enriching of the fuel-air mixture being less than without such enrichment, thus permitting operation of the engine at appropriate power and efficiency level without noticeably increasing fuel consumption in the course of continued operation of the engine.

15 Claims, 6 Drawing Figures

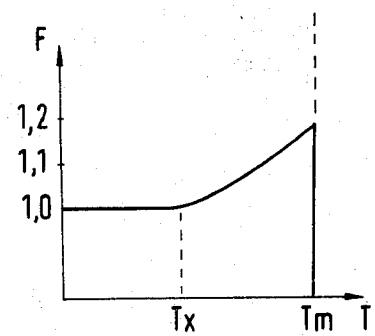
FIG.2
FIG.3
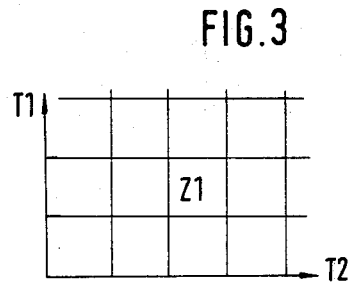
FIG.4
FIG.5
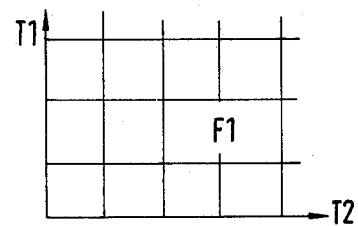
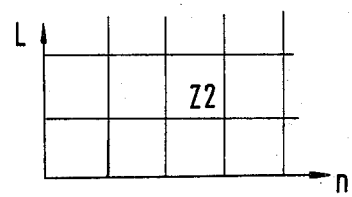
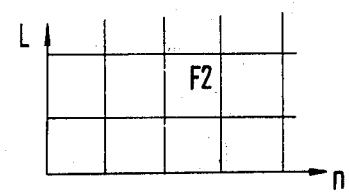
FIG.6

INTERNAL COMBUSTION ENGINE CONTROL SYSTEM FOR USE WITH TURBO-CHARGED ENGINE, AND METHOD

The present invention relates to a control system for internal combustion engines, and more particularly to internal combustion engines which include a turbo charger which so controls the engine that it operates at the most effective engine characteristics without, however, being subjected to overloading or excessive heating.

BACKGROUND

Internal combustion engines, for example of the gasoline type, with turbo supercharging, have the tendency to knock as the motor temperature increases. The tendency to knock is particularly serious upon substantial increase in engine operating temperature which, in turbo-charged engines, may readily occur due to the high degree of filling of the cylinders with combustible fuel-air mixture in accordance with the supercharging by the turbo charger. It has previously been proposed to prevent knocking of the engine by retarding the ignition timing (see, for example, German Patent Disclosure Document DE-OS No. 28 01 512 or DE-OS 26 59 239 to which U.S. Pat. No. 4,133,475 and 4,002,155 correspond). Many types of internal combustion (IC) engines, and particularly turbo-charged engines, then will have exhaust which is excessively hot, and cause excessive heating of the turbo charger. This is undesirable due to the resulting decrease in power and efficiency. It is also possible in turbo-charged motors to decrease the charge in pressure which, however, also decreases the power output.

THE INVENTION

It is an object to control the operating parameters of the engine such that the engine operates efficiently, yet does not overheat.

Briefly, a control apparatus is provided which stores engine operating characteristics and has an engine operating temperature signal applied thereto, providing output signals to a fuel supply system, for example a fuel injection system, which, upon change of the temperature signal indicative of increased operating temperature and above a predetermined state represented by a point or level on a curve of the engine operating characteristics—which characteristics are stored in the control apparatus—controls the fuel supply to increase the proportion of fuel to air and to thereby enrich the fuel-air mixture being supplied to the engine.

In accordance with a feature of the invention, a maximum limiting temperature is sensed which, when it is reached, inhibits flow of fuel to the engine. In addition to changing the fuel-air composition, the ignition timing can also be retarded. By enriching the fuel-air mixture, the degree of retardation of the spark can be substantially less, however, than in prior art systems, in which the fuel-air mixture was not interfered with. Both fuel enrichment as well as spark retardation can readily be set for specific engine types so that the engine will operate at its most efficient and power delivering characteristic operating point.

The control system according to the present invention has the advantage that knocking of the IC engine can be prevented even at high engine temperatures without noticeable or substantial decrease in power output. Surprisingly, the increase in fuel use resulting from the increased fuel component in the fuel-air mixture is hardly noticeable, so that the average fuel consumption is hardly changed and can barely be measured. The reason appears to be that the increase in fuel occurs only if there is actual danger of engine knocking and is not continuously effective.

Engines which operate with fuel injection can be controlled particularly easily, since characteristics which are stored in a computer controlling engine operation can be so arranged that fuel injection and ignition timing is set for optimum engine performance, for example for optimum minimum fuel consumption, without considering the results of such control with respect to the tendency to knock. By then increasing the fuel component of the fuel-air mixture, that is, by making the fuel-air mixture somewhat richer in order to prevent knocking, an additional control signal can be used which is derived as a modifying signal which can readily be introduced into a program controlled device as an additional modifying factor. Not only is knocking of the engine prevented but, simultaneously, excessive heating or boiling of the engine is reliably prevented.

The temperature-dependent control which causes enrichment of the fuel-air mixture and/or changing of ignition timing, typically ignition retardation, can be derived from engine operating characteristic data stored in a suitable memory or storage device, for example a "read-only memory" (ROM). The point on the characteristic diagram at curve which causes change in the fuel-air composition, that is, enrichment of the mixture and/or change in ignition timing, can be selected based on temperatures measured at different points in the engine system, for example engine operating temperature, exhaust temperature, supercharging air temperature, or turbo supercharger apparatus, and, preferably, also based on speed and, if desired, additionally based on load placed on the engine, for example as sensed in the form of induction air absolute pressure, or a representative derived signal, which may for example be the timing signal in a fuel injection system.

DRAWINGS:

FIG. 2 is a typical operating diagram illustrating the operation of the system and the method of the present invention to enrich the fuel-air mixture above a fixed operating point;

FIGS. 3 and 4 are diagrams illustrating generation of an additive ignition timing angle component; and FIGS. 5 and 6 are diagrams illustrating generation of a fuel-air enrichment factor.

Figure 1:
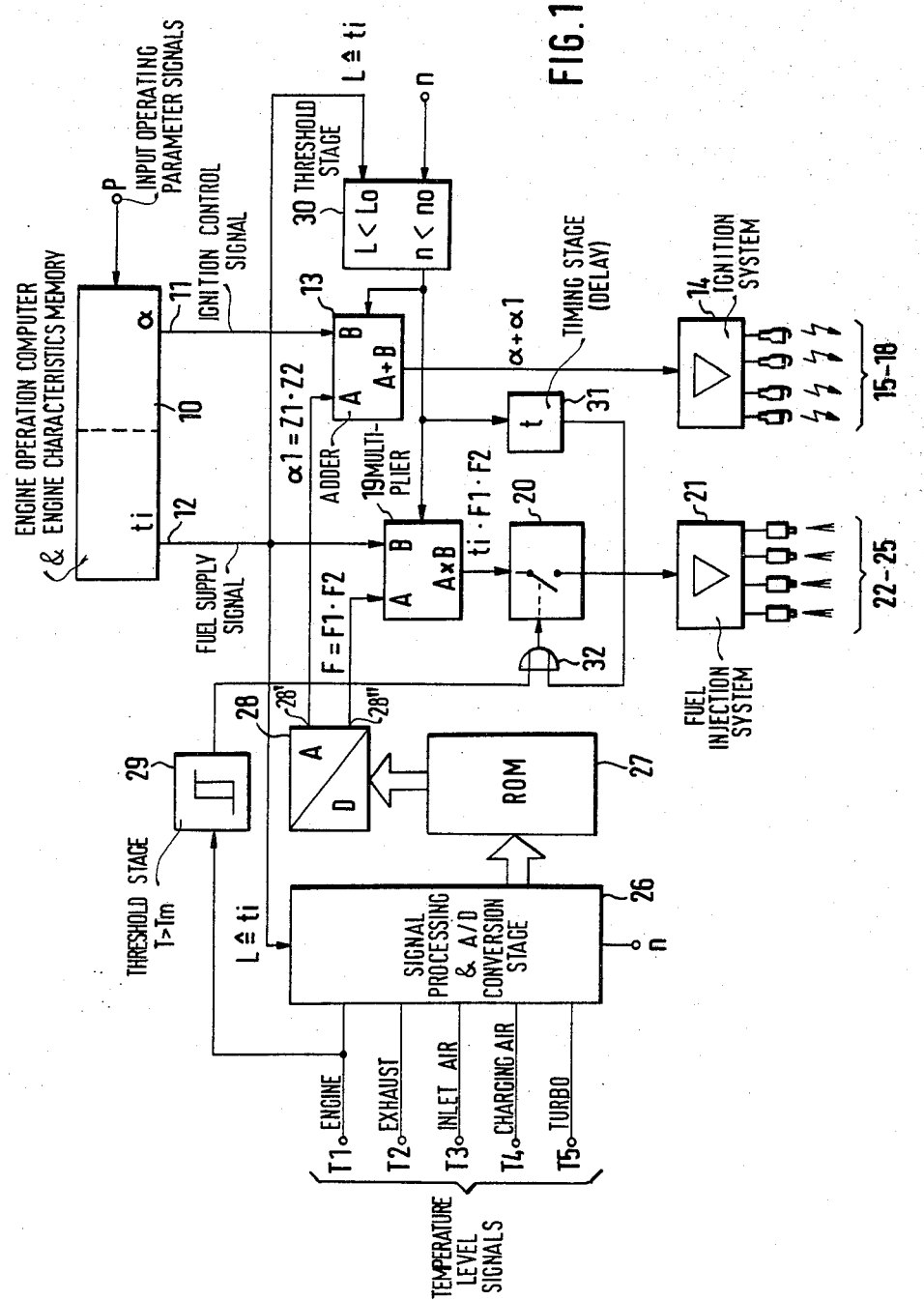
FIG. 1 is a schematic block diagram of the system of the invention.

Referring to FIG. 1: An electronic engine operation computer and engine characteristic memory 10 is controlled in dependence on engine operating parameters P, and provides output signals which control the dwell angle for the ignition, the ignition instant in form of an angle signal representative of an angle $\alpha$ with respect to the top dead center (TDC) position of a reference piston, as well as a basic fuel injection time ti of a fuel injection system. Such apparatus is known, see for example German Patent Disclosure Document DE-OS No. 28 50 534 or DE-OS No. 30 00 562, to which U.S. applications Ser. No. 56,960, July 12, 1979, now U.S. Pat. No. 4,250,858, JEENICKE et. al., and Ser. No. 221,788, Dec. 31, 1980, now U.S. Pat. No. 4,337,744, SEEGER et al., assigned to the assignee of this application, correspond; it is in public use, and installed in serially made motor vehicles, for example motor vehicles manufactured and sold by the German company BMW/(Bayerische Motoren Werke). The computer 10 has a first control output terminal 11 providing an ignition control signal and a second control output 12 providing a fuel supply signal which is a time pulse to control opening of a fuel supply injection valve. The computer 10 includes a memory which provides the control outputs as a function of the engine parameters P in accordance with characteristic curves which are stored in the memory, for example in one or more ROMs, as described for example in the aforementioned publications, and in operating manuals, and as in actual public use.

The ignition control signal output 11 is connected to an adder 13 which, in turn, is connected to an ignition system 14 which provides suitable spark energy, distributed to, for example, four spark plugs 15–18. The fuel supply signal output 12 is connected through a multiplier 19 to a fuel injection system 21 which, in the example shown, has four injection valves 22 to 25, controlled thereby. Any desired number of fuel injection valves or spark plugs can be controlled by the system shown, and as modified in accordance with the present invention.

A signal processing and analog/digital (A/D) conversion stage 26 has five temperature signals applied thereto. These five temperature signals, connected to inputs T1 to T5 are derived from suitable sensors, in which T1, for example, is engine temperature, T2 the exhaust gas temperature, T3 induction or inlet air temperature, T4 charging air temperature derived from a turbo supercharger, and T5 the turbo charger temperature. Additionally, the stage 26 receives a signal representative of the speed n of the engine and a signal representative of the load L. The load signal L is preferably derived directly from the injection timing signal ti and representative of base fuel injection time. The two temperatures T4 and T5, of course, can be measured only at an engine having a turbo supercharger. In a simpler version, a lesser number of temperatures can be provided and evaluated, and in the simplest case, only a single temperature is necessary, for example engine temperature T1. In a simpler version, the input signal L representative of load and the speed signal n, or either of them, can also be omitted.

The signal processing stage 26 processes the received input signals to change them to suitable processing levels, possibly passing them through wave-shaping or filtering networks to remove disturbances, and then, in an A/D stage, converts the received input signal into digital signal values. The digital signal values will be representative of addresses for the characteristic curves stored in an ROM 27 to which the processed signals are connected. The stored values read out from the ROM 27, in accordance with the addresses supplied by the stage 26, are then converted into analog values in D/A converter 28, deriving as the output from D/A converter 28 two control signals. The ROM 27 contains values relating the inputs to ignition angles $\alpha 1$ to provide appropriate output signals at output terminal 28′, and two values F at output terminal 28″ to modify the fuel supply signal from terminal 12 of computer 10. Providing control signals from characteristics stored in a memory, as such, is well known and can be carried out in accordance with any suitable method or system. The output from terminal 28′ is applied as an adding input to terminal A of adder stage 13; the output from terminal 28″ is supplied as a multiplying factor to terminal A of multiplier 19. A voltage value representative of engine temperature T1 additionally is supplied to a threshold stage 29, the output of which is connected through an OR-gate 32 to a switching stage 20 to control a switch therein.

A second threshold stage 30 is provided which receives a load signal which, like the load signal L applied to the stage 26, can be derived from the fuel supply signal ti. Further, the threshold stage 30 receives a speed signal n representative of engine output speed. The output from the threshold stage 30 is applied to the adder 13 and to the multiplier 19 in such a way that, if the output signal from the threshold stage 30 has a predetermined value, for example is a 1-signal, the inputs applied to the terminals A of the respective stages 13, 19 are no longer effective; the output from threshold stage 30, thus, is effective to disable modification of the signals derived from the computer 10 and applied to the respective ignition system 14 and the fuel injection system 21. In case of the adder 13, the additional angle $\alpha 1$ will thus be set to zero; for the multiplier stage 19, the factor F will be 1.0.

Operation, and method of control, with reference to FIGS. 2–6: Basically, the combustible fuel-air mixture is enriched when the engine, or one of its components, as determined by one or more of the temperatures T1, T2 ... T5, reaches a value which might cause knocking. Enrichment lowers the combustion temperature, and thus decreases the tendency to knocking. Turbocharged motors have the characteristic that enrichment must frequently go to substantially over the level necessary to achieve maximum power output, but only if high motor temperatures result due to stationary operation, that is, without moving cooling air flow. For optimum matching of the engine operation to these conditions, a graph as seen in FIG. 2 is derived relating enrichment to temperature. This graph can be derived theoretically or emperically by measurements. This graph, that is, the characteristic curve, is stored in the ROM 27. FIG. 2 illustrates a simple case, namely enrichment as a function of a single measured temperature. Enrichment is effected by multiplying the base fuel injection period ti by a multiplying factor F in the multiplying stage 19, that is, by modifying the base injection period so that it will be extended. The extended effective injection time then provides for the desired enrichment. This enrichment function, in the example shown, will become effective only starting from a temperature tx, and only in a region which is provided by the load, determined by the load signal L, and at a speed n. Only in the region where danger of knocking may result, that is, at a load higher than a base load Lo, and/or at a speed higher than a base speed no, is it desired to enrich the fuel-air mixture. If the values for L and n are below these base values, then, as above described, the multiplying factor F, applied to the multiplying stage 19, will be set to become 1.0 by operation of the threshold stage 30.

The threshold stage 29 will respond if the engine temperature rises over a maximum permissible limiting value tm. Response of the threshold stage 29 cuts off fuel injection by opening the switch 20. This will either cause drop-out of the load signal below Lo, or the speed below no. If either one of these signals drops below the base value, a timing delay stage 31 is triggered, the timing delay stage 31 being connected through OR-gate to switch 20 so that, after the delay set into the timing unit, the switch 20 will again close, thus permitting injection of fuel to resume. It is, of course, also possible to omit the timing stage 31 and to initiate new injection of fuel directly by the output from threshold stage 29, and introducing some hysteresis into the switching characteristics of the threshold stage 29 so that, after engine temperature drops, switch 20 is commanded to change back to connected condition. Smoothness of operation of the vehicle can be improved by avoiding a reconnection jolt, upon sudden re-supply of fuel, as known from prior publications—see, for example, German Patent Disclosure Document DE-OS 28 34 638, to which U.S. application Ser. No. 52,342, June 27, 1979, now U.S. Pat. No. 4,285,314, KIENCKE et al., assigned to the assignee of the present application, corresponds—which discloses automatic spark retardation upon resumption of fuel supply after an interruption, and gradual change of the spark to the commanded value to thereby gradually supply power to the engine, rather than suddenly.

The knocking limit, that is, the limit of engine operation before the engine will knock, can be additionally controlled by also controlling the ignition timing in dependence on one or more temperatures, as sensed. ROM 27, or a portion thereof, can retain characteristics in which an additional ignition timing angle $\alpha 1$ is added to the ignition timing angle $\alpha$ in the adding stage 13. The ignition timing signal $\alpha 1$ changes the ignition timing angle $\alpha$ commanded for example by the ignition control signal 11 in retarding direction, so that, consequently, retardation of the spark by the angle $\alpha 1$ will result in dependence on temperature. Again, this change is suppressed if the threshold stage 30 has responded, that is, below load limits of the base load Lo and the base speed no set into the threshold stage.

Additional parameters can be used in order to control the temperature dependent enrichment of the fuel-air mixture and/or temperature dependent ignition timing adjustment; various temperatures or several temperatures can be used as control parameters in addition to the additional parameters. Preferably, such additional parameters or additional temperature control is effected in accordance with well known computer control of engine operating characteristics, and stored within the memory of unit 10. FIGS. 3 to 6 illustrate control in accordance with characteristic diagrams in dependence on engine temperature T1 and exhaust temperature T2, the load signal L, and the speed n. The first two parameters, temperatures T1 and T2, form a single function with respect to knocking limits which, in case of the ignition, results in a correction ignition angle Z1 (FIG. 3) and, for fuel injection, in a correction factor F1. The two further parameters, load and speed, together form a further function which, in case of ignition, results in a correction factor Z2 with respect to the correction angle Z1 and, in case of fuel injection, in a further correction factor F2. The four parameters can be combined with respect to their various functions, leading to characteristic fields or curves which are stored in the ROM 27. Specific points of these characteristics, in case of ignition $Z1 \times Z2$, and in case of fuel injection $F1 \times F2$, can be selected according to any desired combination of the four parameters. A corrected ignition angle will then result: $\alpha + \alpha 1$, in which $\alpha 1 = Z1 \times Z2$. A corrected fuel injection time is determined by ti F, in which $F = F1 \times F2$.

The functions and characteristics can be introduced, of course, as additional characteristic functions included in the engine operation computer and engine characteristic memory, and integrated therewith. The characteristics for the temperature dependent correction of the ignition timing—in direction of ignition retardation, and of injection time—in the direction of making the fuel-air mixture richer, that is, more fuel per quantity of air, can be superimposed over, or modulated on, the basic engine operating characteristics stored in the stage 10. The output from threshold stage 30 should then, suitable, be connected to stage 10 or an equivalent recognition stage be included in the operating computer 10.

Various changes and modifications may be made within the scope of the inventive concept.

We claim:

1. Internal combustion engine (IC) control system, for an IC engine having a turbocharger
    to control the admission and combustion of a fuel-air mixture being supplied to the engine comprising
    means for supplying a fuel-air mixture to the engine having a controlled fuel-air ratio;
    means (T1) for providing an engine operating temperature signal representative of at least one of: engine temperature (T1); exhaust gas temperature (T2); inlet or induction air temperature (T3); turbo charging air temperatures (T4); turbo charger temperature (T5) arising in the operation of the engine;
    means to prevent knocking of the engine which comprises
    control means (26, 27, 30) including memory means (27) storing engine operating characteristics as a function of engine operating temperature,
    said control means having said engine operating temperature signal applied thereto and furnishing an output signal to said fuel-air mixture supply means upon change of the operating temperature signal, indicative of increased operating temperature, above a predetermined level,
    to increase the proportion of fuel to air to thereby enrich the fuel-air mixture being supplied to the engine.

2. System according to claim 1, where said means for providing an engine operating temperature signal provides a signal representative of at least one of: engine temperature (T1); exhaust gas temperature (T2); inlet or induction air temperature (T3).

3. System according to claim 1, and wherein said means for supplying fuel to the engine comprises (10, 19) a fuel injection system (10, 12; 21, 22-25) having means (10, 19) for determining fuel injection time (ti);
    and wherein the output signal furnished by said control means is applied as a multiplying factor (F) to said time determining means to modify the fuel injection time (ti) commanded by the fuel injection system.

4. System according to claim 1, further including means (29) for sensing a maximum engine temperature and providing a maximum temperature signal (Tm);
    and additional control means (20) connected to and controlled by said maximum temperature sensing means and inhibiting supply of fuel to the IC engine if the maximum temperature is reached or exceeded.

5. System according to claim 4, wherein the means applying fuel comprises a fuel injection system (10, 12; 21, 22-25) and said additional control means comprises a switch (20) connected to said fuel injection system and controlling interruption of fuel injection.

6. System according to claim 1, further including an ignition angle control system (10, 11; 14, 15-18) controlling the ignition instant;

and wherein said IC engine control system further includes means (13) retarding the ignition instant as a function of the output signal from said control means (26, 27, 30) upon change of the temperature signal indicative of increase of operating temperature of the engine above a predetermined point of the engine ignition timing operating characteristics.

7. System according to claim 6, wherein the ignition angle control system includes an adder stage (13), and the retarding means furnishes an output signal representative of a retardation angle ($\alpha 1$) algebraically applied as an additive value ($\alpha 1$) to the ignition angle ($\alpha$) commanded by the ignition angle control system.

8. System according to claim 1, wherein the control means includes a threshold stage (30) determining a threshold level responsive to an operating parameter comprising at least one of: load; speed; and furnishing a threshold output signal if said at least one parameter (L, n) is passed, the output signal being connected to and controlling said control means furnishing the output signal for the fuel supply means to inhibit application of the output signal therefrom.

9. System according to claim 8, further including an ignition angle control system (10, 11; 14, 15-18) wherein the threshold output signal inhibits change of the ignition angle in dependence on rise in temperature.

10. System according to claim 8, wherein the threshold output signal inhibits increase of fuel supply by the fuel supply means.

11. System according to claim 1, wherein the memory (ROM) (27) storing predetermined values (F) of fuel supply as a function of the temperature signals applied to said control means.

12. System according to claim 11, wherein said control means furnishing the output signal to said fuel supply means is additionally responsive to at least one of the engine operating parameters comprising: speed (n); load (L).

13. Method of controlling operation of a turbocharged internal combustion engine system, which system controls the admission and combustion of a fuel-air mixture being supplied to the engine, said system having means (21, 22-25) for supplying fuel to the engine, and means (T1-T5) providing an engine operating temperature signal representative of at least one of: engine temperature (T1); exhaust gas temperature (T2); inlet or induction air temperature (T3); turbo charging air temperature (T4); turbo charger temperature (T5), said method comprising the steps of determining a desired operating state for the engine, in which the operating state is related to a desired operating temperature;

sensing actual operating temperature and deriving said temperature signal as a function thereof;

and enriching the fuel of the fuel-air mixture upon change of the operating temperature signal indicative of rise of temperature above the desired operating state.

14. Method according to claim 13, wherein said step of enriching the fuel of the fuel-air mixture comprises determining a characteristic relationship of temperature, fuel component of the fuel-air mixture, and operating parameters including at least one of: speed; load, of the engine;

and multiplying a controlled parameter (F) representative of fuel being supplied to the engine in accordance with said relationship by a factor (F1) if said temperature signal indicates that the temperature of the engine has risen above the point of the curve pertaining to then existing operating conditions.

15. Method according to claim 14, wherein the engine has an ignition timing system (10, 11; 14, 15-28) including the further step of retarding the ignition angle in accordance with a predetermined engine operating relationship upon change of the operating temperature signal indicative of rise in temperature above a predetermined point of desired engine operating characteristics.

* * * * *